United States Patent
Polonsky et al.

(10) Patent No.: US 10,083,075 B1
(45) Date of Patent: Sep. 25, 2018

(54) SYSTEM, METHOD, AND COMPUTER PROGRAM FOR AUTOMATIC DISCARD OF CORRUPT MEMORY SEGMENTS

(71) Applicant: Amdocs Development Limited, Limassol (CY)

(72) Inventors: Vladimir Polonsky, Ramat-Gan (IL); Ziv Orovan, Binyamina (IL); Shivasharana Satish Rao, Pune (IN)

(73) Assignee: AMDOCS Development Limited, Limassol (CY)

( * ) Notice: Subject to any disclaimer, the term of this patent is extended or adjusted under 35 U.S.C. 154(b) by 207 days.

(21) Appl. No.: 15/132,144

(22) Filed: Apr. 18, 2016

Related U.S. Application Data

(60) Provisional application No. 62/155,407, filed on Apr. 30, 2015.

(51) Int. Cl.
*G06F 11/07* (2006.01)
*G06Q 10/10* (2012.01)
*G06F 3/06* (2006.01)

(52) U.S. Cl.
CPC .......... *G06F 11/0793* (2013.01); *G06F 3/064* (2013.01); *G06F 3/0619* (2013.01); *G06F 3/0631* (2013.01); *G06F 3/0652* (2013.01); *G06F 3/0673* (2013.01); *G06F 11/079* (2013.01); *G06F 11/0727* (2013.01); *G06F 11/0751* (2013.01); *G06Q 10/10* (2013.01)

(58) Field of Classification Search
CPC .............. G06F 11/141; G06F 11/1072; G06F 11/1415; G06F 11/1666
See application file for complete search history.

(56) References Cited

U.S. PATENT DOCUMENTS

| | | | | |
|---|---|---|---|---|
| 9,268,904 B1* | 2/2016 | Harding | ............ | G06F 17/30294 |
| 2006/0101215 A1* | 5/2006 | Yuasa | ................. | G06F 11/1004 711/162 |
| 2006/0259518 A1* | 11/2006 | Lomet | ................. | G06F 11/1474 |
| 2007/0150791 A1* | 6/2007 | Gross | ................. | G06F 11/1044 714/763 |
| 2010/0036805 A1* | 2/2010 | Blamer | ............ | G06F 17/30457 711/118 |
| 2012/0110369 A1* | 5/2012 | Tylutki | ................ | G06F 11/0793 714/2 |

* cited by examiner

*Primary Examiner* — Jigar Patel
(74) *Attorney, Agent, or Firm* — Zilka-Kotab, PC

(57) ABSTRACT

A system, method, and computer program product are provided for automatic discard of corrupt memory segments. In use, one or more memory blocks are allocated to specific business related information. Additionally, the one or more memory blocks allocated to the specific business related information are assigned to one or more first memory regions, the one or more first memory regions being a portion of a memory that includes a plurality of memory regions in addition to the one or more first memory regions, the plurality of memory regions including a plurality of other business related information. Further, it is identified that the specific business related information is corrupt. Moreover, the specific business related information is discarded from the memory and a master memory, such that the plurality of other business related information is not discarded.

14 Claims, 4 Drawing Sheets

SYSTEM, METHOD, AND COMPUTER PROGRAM FOR AUTOMATIC DISCARD OF CORRUPT MEMORY SEGMENTS

CLAIM OF PRIORITY

This application claims the benefit of U.S. Provisional Application No. 62/155,407, filed Apr. 30, 2015, the entire contents of which are incorporated herein by reference.

FIELD OF THE INVENTION

The present invention relates to memory systems, and more particularly to efficiently discarding corrupt memory segments from such memory systems.

BACKGROUND

In the context of memory systems and in particular to event-processing applications, which are required for real-time response time, it is very common to use multi-tiered memory caching to boost application performance. An event driven application, when receiving an event, typically retrieves the data from a master memory to a local cache, processes the event on the local cache and afterward syncs the modified data into the master memory store.

In the case of data corruption during the event processing or data serialization, corrupted data will be stored in the master memory.

There is thus a need for addressing these and/or other issues associated with the prior art.

SUMMARY

A system, method, and computer program product are provided for automatic discard of corrupt memory segments. In use, one or more memory blocks are allocated to specific business related information. Additionally, the one or more memory blocks allocated to the specific business related information are assigned to one or more first memory regions, the one or more first memory regions being a portion of a memory that includes a plurality of memory regions in addition to the one or more first memory regions, the plurality of memory regions including a plurality of other business related information. Further, it is identified that the specific business related information is corrupt. Moreover, the specific business related information is discarded from the memory and a master memory, such that the plurality of other business related information is not discarded.

DETAILED DESCRIPTION

Figure 1:
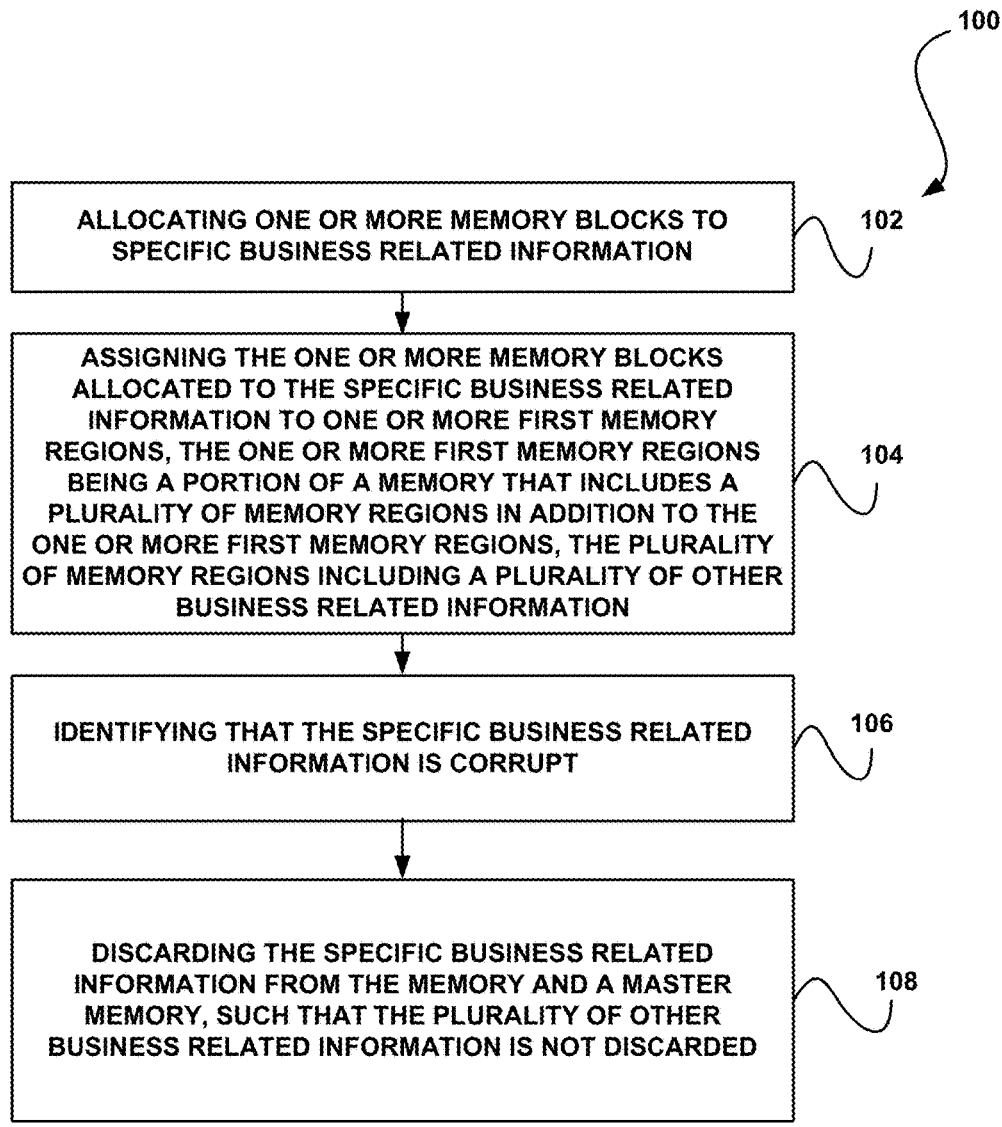
FIG. 1 illustrates a method for automatic discard of corrupt memory segments, in accordance with one embodiment.

FIG. 1 illustrates a method 100 for automatic discard of corrupt memory segments, in accordance with one embodiment.

As shown, one or more memory blocks are allocated to specific business related information. See operation 102. The business related information may include any type of information of any size.

Additionally, the one or more memory blocks allocated to the specific business related information are assigned to one or more first memory regions. See operation 104. The one or more first memory regions are a portion of a memory that includes a plurality of memory regions in addition to the one or more first memory regions. The plurality of memory regions include a plurality of other business related information.

The other business related information may include any business related information. Further, the other business related information is different from the specific business related information. In addition, the first memory regions do not include memory blocks associated with the plurality of other business related information that is different from the specific business related information.

In one embodiment, a memory manager may perform the isolated memory allocation of operation 102 and 104 by allocating the memory blocks to the specific business related information and assigning the memory blocks allocated to the specific business related information to the first memory regions.

As shown in further in FIG. 1, it is identified that the specific business related information is corrupt. See operation 106. The specific business related information may be identified as corrupt in a variety of ways.

For example, identifying that the specific business related information is corrupt may include identifying a signal associated with an action being performed on corrupted data associated with the specific business related information. As an example, the signal may include an invalid segmentation signal.

In one embodiment, a thread responsible for triggering the signal may also be identified. In this case, a business related information identifier associated with the thread responsible for triggering the signal may be identified. The business related information identifier may include an identifier for the specific business related information and the specific business related information may be identified utilizing the identifier for the specific business related information.

In one embodiment, a recovery manager may log the identifier for the specific business related information when the specific business related information is being handled by the executing thread. Additionally, a signal handler may identify the signal indicating the business related information is corrupt.

With further reference to FIG. 1, the specific business related information is discarded from the memory and a master memory, such that the plurality of other business related information is not discarded. See operation 108. In one embodiment, discarding the specific business related information from the memory and the master memory may be performed when the corruption of the specific business related information occurs.

The specific business related information and the plurality of other business related may be stored in the master memory, as well as the memory. Further, the memory and the master memory may include any type of memory. In one embodiment, the memory may include local memory associated with a first system (e.g. cache, etc.) and the master memory may include a memory store associated with a plurality of systems.

In any case, discarding the specific business related information from the master memory does not affect the plurality of other business related information stored in the master memory. Additionally, discarding the specific business related information from the memory and the master memory may function such that data loss is minimized to only the corrupt specific business related information.

Furthermore, identifying that the specific business related information is corrupt may occur without performing a check-sum operation and/or performing a cyclic redundancy check (CRC) operation.

Accordingly, the corrupted segment automatic discard method 100 may be implemented to mitigate unrecoverable memory corruption by removing only the corrupted memory segment without impacting performance (e.g. key performance indicators, etc.), using application knowledge in the decision of the corrupted segment boundaries.

It should also be noted that the method 100 may be implemented utilizing various hardware, software, applications, user interfaces, etc., as dictated by the implementer. More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
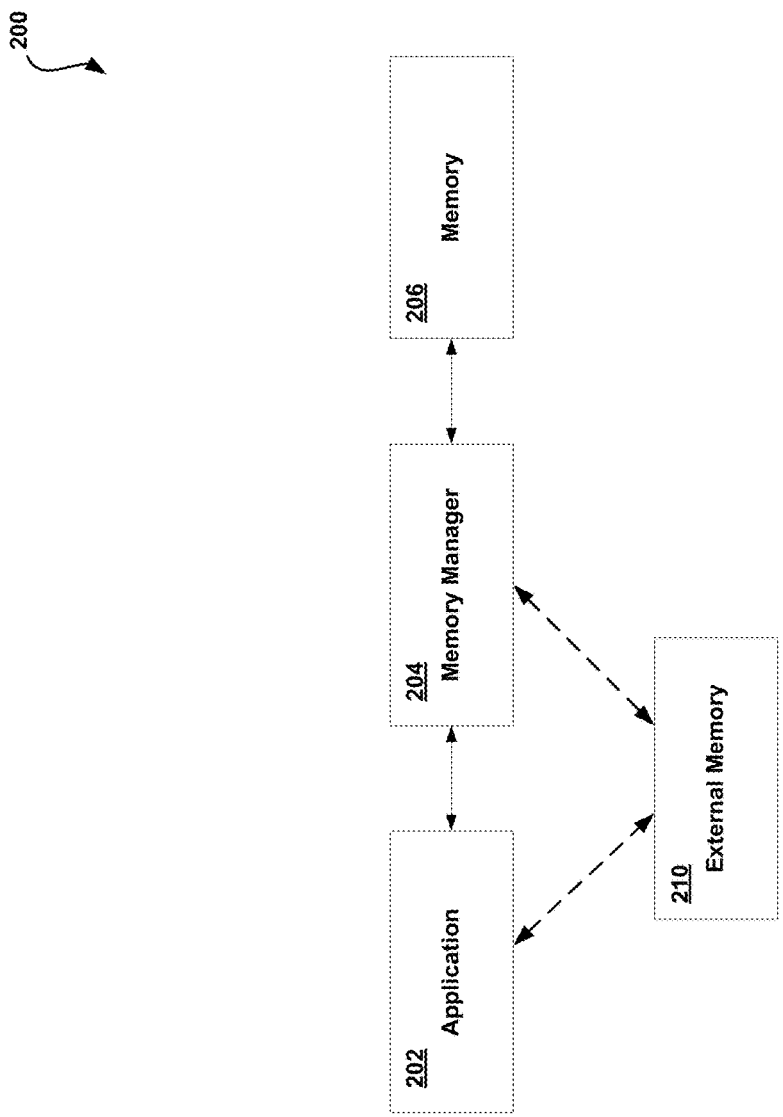
FIG. 2 illustrates a block diagram of a system for automatic discard of corrupt memory segments, in accordance with one embodiment.

FIG. 2 illustrates a block diagram of a system 200 for automatic discard of corrupt memory segments, in accordance with one embodiment. As an option, the system 200 may be implemented in the context of the details of FIG. 1. Of course, however, the system 200 may be implemented in the context of any desired environment. Further, the aforementioned definitions may equally apply to the description below.

As shown in FIG. 2, a software application 202 is in communication with a memory manager 204 and a memory 206. In one embodiment, the software application 202 and/or the memory manager 204 may also be in communication with external memory 210.

In one embodiment, the memory 206 may represent local cache memory and the external memory 210 may represent a master storage. In the system 200, local cache memory may be highly-available and remain approachable to the failover process (e.g. on master process failure). Additionally, business related information (BRI) entities may be independent from the viewpoint of the application 202. In other words, the business related information may be defined in such a way that processing using information from one business related information does not impact other business related information.

Such partitioning may exist in many systems dealing with customers, zones and other sharding factors of the relevant population.

In operation, all allocated memory blocks belonging to the same business related information may be placed in common memory regions. No region may be allowed to contain memory blocks storing the data of different business related information.

Processing is performed in a way that ensures that different business related information can be processed independently. Thus, their memory blocks are also independent from other business related information's memory.

As soon as corrupted business related information is identified, the application 202 discards the relevant business related information from the local cache 206, as well as from the master storage 210.

The corrupted business related information identification may be accomplished by the application 202 by triggering an OS signal (e.g. invalid segmentation). A signal handler routine may catch the signal, and determine which thread is responsible for signal triggering.

The handling routine may use information stored in a software recovery manager to extract a business related information ID processed by the thread at the time of the signal throwing.

The recovery manager may be able to handle the specific memory belonging to the corrupted business related information.

Existent memory diagnostic algorithms use mainly check-sum approach to find corrupted data on both applicative and OS levels. The main drawbacks of this approach are performance overhead and difficulty to narrow down the corrupted segment boundaries due to potential dependency of the chunks. This may lead to incomplete removal of relevant memory, and inconsistency of the business related information.

The techniques described in the context of FIG. 2 allow shared control over the memory integrity between the process foundation utilities (e.g. such as a memory manager, a recovery manager, and a signal handler) and the application. While the memory manager 204 performs the isolated memory allocation for each business related information, the recovery manager may log the ID of the business related information handled by the executing thread, the signal handler may receive the signal and identify the corrupted business related information, and the application 202 may decide when to act and what object/area should be discarded.

This allows the application 202 to handle the corruption so that only the affected business related information will be discarded from both local memory 206 and master memory 210. Data loss is minimized to the impacted business related information. Also, this action does not require performing tedious check-sums or CRCs continuously. This action is performed only when the corruption occurs, as identified by the application 202. The result may include a positive impact on performance.

In one embodiment, these techniques may be employed to solve memory corruption problems that occur at runtime of a Turbo Charging Event Server (Event Server) process.

For example, an Event Server may keep its data in a shared memory segment of a fixed size. The segment may be created when the Event Server starts and serves as a local cache that stores customers' data. The Event Server may have a flow managing mechanism that ensures only one event per customer can be processed at a time. In addition, the Event Server may use an In-Memory Data Grid (IMDG) as a master data storage.

The contents of the IMDG is consistent and can be put inside the shared memory segment at any point replacing its contents without any data loss. Once a particular customer receives an event, it is processed using the data stored in local cache (if the data is not there, it is retrieved from the IMDG), and at the end, all the customer data changes are synchronized into the IMDG (i.e. the master data store). The problem is that once corrupted data of a specific customer is stored in the IMDG, it will cause the failure of event server on the next data fetch from IMDG to local storage.

Thus, by implementing the techniques described herein, each working thread of the Event Server, on the beginning of event handling, may store a customer ID in a Recovery Manger mechanism.

Upon receiving a signal thrown by the OS in case of corruption, the Signal Handler of the Event Server may be triggered. The Signal Handler may identify the details of the erred thread and identify the ID of the customer with corrupted data.

Due to technical limitations, the Signal Handler may not approach the IMDG at this phase, but it can mark an erred customer as corrupted in the local cache memory.

The failover Event Server that replaces the failure may connect to the local memory, find the corrupted customer, and discard it from both local and master data stores.

Figure 3:
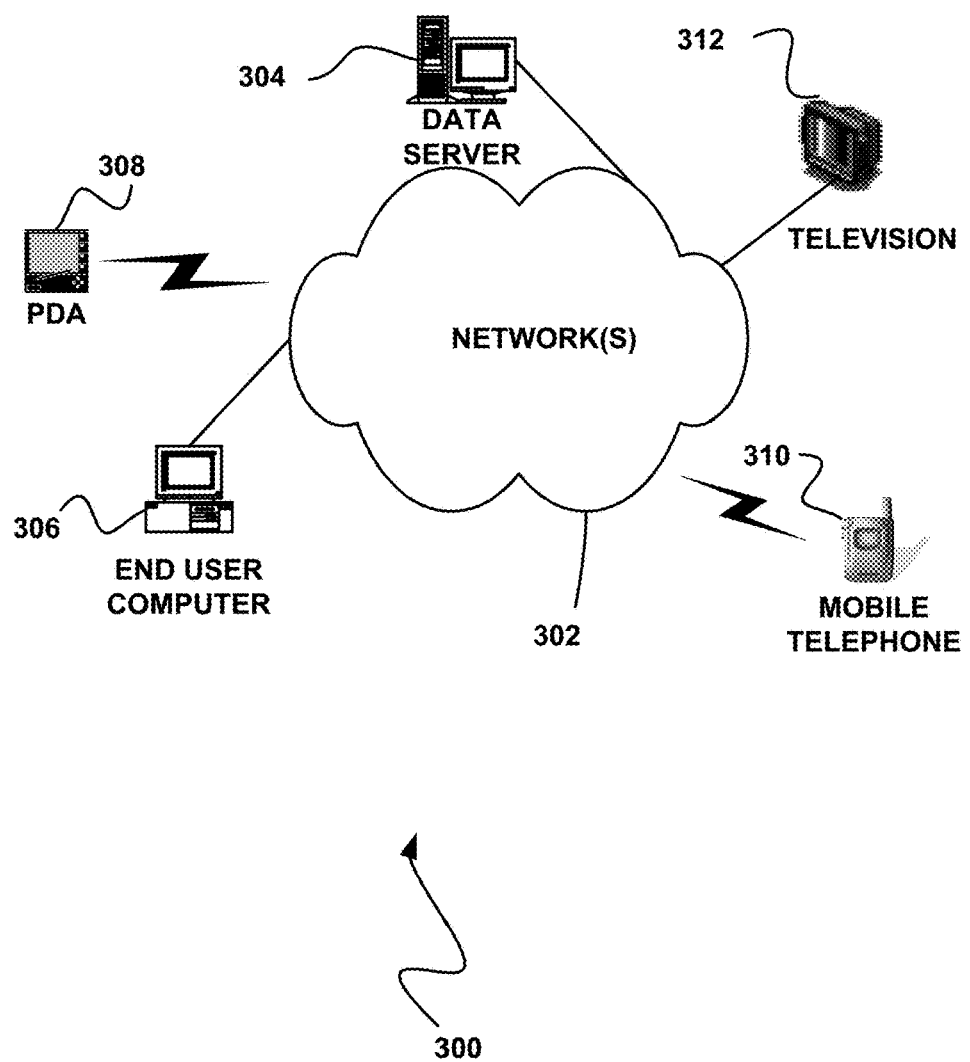
FIG. 3 illustrates a network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, etc.

Figure 4:
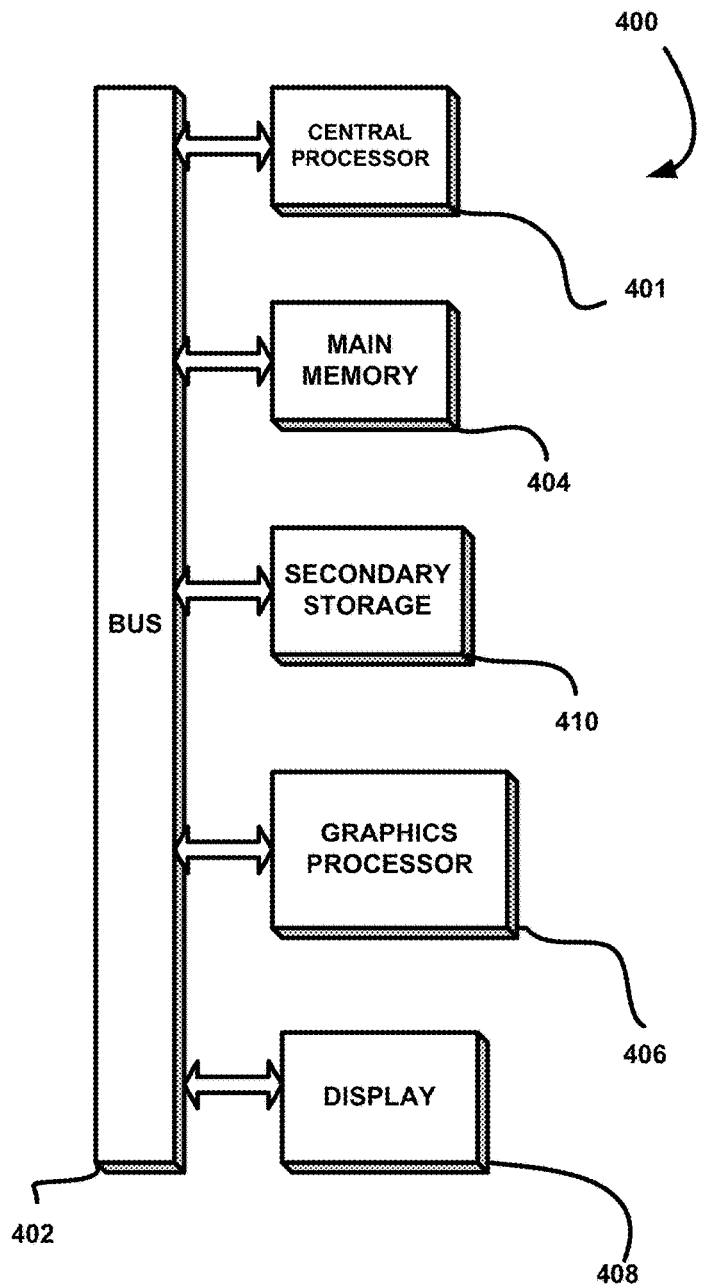
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method, comprising:
    allocating one or more memory blocks to specific business related information;
    assigning the one or more memory blocks allocated to the specific business related information to one or more first memory regions of a memory, the memory further including a plurality of second memory regions storing other business related information;
    identifying a corruption of the specific business related information when the corruption occurs by:
        catching an invalid segmentation signal thrown by an operating system responsive to a thread processing the specific business related information in a manner that causes the corruption,
        responsive to catching the invalid segmentation signal, determining the thread processing the specific business related information, and
        identifying the specific business related information based on the thread; and
    discarding the identified specific business related information from the memory and a master memory when the corruption of the specific business related information occurs, without discarding the other business related information.

2. The method of claim 1, wherein the specific business related information and the plurality of other business related information is stored in the master memory.

3. The method of claim 2, wherein discarding the specific business related information from the master memory does not affect the other business related information stored in the master memory.

4. The method of claim 1, wherein the memory includes local memory associated with a first system and the master memory includes a memory store associated with a plurality of systems.

5. The method of claim 1, further comprising identifying a business related information identifier associated with the thread for use in identifying the specific business related information, the business related information identifier including an identifier for the specific business related information.

6. The method of claim 5, wherein a recovery manager logs the identifier for the specific business related information when the specific business related information is being handled by the thread.

7. The method of claim 6, wherein a signal handler catches the invalid segmentation signal.

8. The method of claim 7, wherein an application determines the specific business related information should be discarded.

9. The method of claim 8, wherein a memory manager performs isolated memory allocation by allocating the one or more memory blocks to the specific business related information and assigning the one or more memory blocks allocated to the specific business related information to the one or more first memory regions.

10. The method of claim 1, wherein discarding the specific business related information from the memory and the master memory functions such that data loss is minimized to only the corrupt specific business related information.

11. The method of claim 1, wherein identifying that the specific business related information is corrupt occurs without performing a check-sum operation.

12. The method of claim 1, wherein identifying that the specific business related information is corrupt occurs without performing a cyclic redundancy check (CRC) operation.

13. A computer program product embodied on a non-transitory computer readable medium, comprising:
    computer code for allocating one or more memory blocks to specific business related information;
    computer code for assigning the one or more memory blocks allocated to the specific business related information to one or more first memory regions of a memory, the memory further including a plurality of second memory regions storing other business related information;
    computer code for identifying a corruption of the specific business related information when the corruption occurs by:
        catching an invalid segmentation signal thrown by an operating system responsive to a thread processing the specific business related information in a manner that causes the corruption,
        responsive to catching the invalid segmentation signal, determining the thread processing the specific business related information, and
        identifying the specific business related information based on the thread; and computer code for discarding the identified specific business related information from the memory and a master memory when the corruption of the specific business related information occurs, without discarding the other business related information.

14. A system comprising:

a memory system; and one or more processing cores coupled to the memory system and that are each configured to:

allocate one or more memory blocks to specific business related information;

assign the one or more memory blocks allocated to the specific business related information to one or more first memory regions of a memory, the memory further including a plurality of second memory regions storing other business related information;

identify a corruption of the specific business related information when the corruption occurs by:

catching an invalid segmentation signal thrown by an operating system responsive to a thread processing the specific business related information in a manner that causes the corruption, responsive to catching the invalid segmentation signal, determining the thread processing the specific business related information, and identifying the specific business related information based on the thread; and discard the identified specific business related information from the memory and a master memory when the corruption of the specific business related information occurs, without discarding the other business related information.

* * * * *